United States Patent Office 3,175,381
Patented Mar. 30, 1965

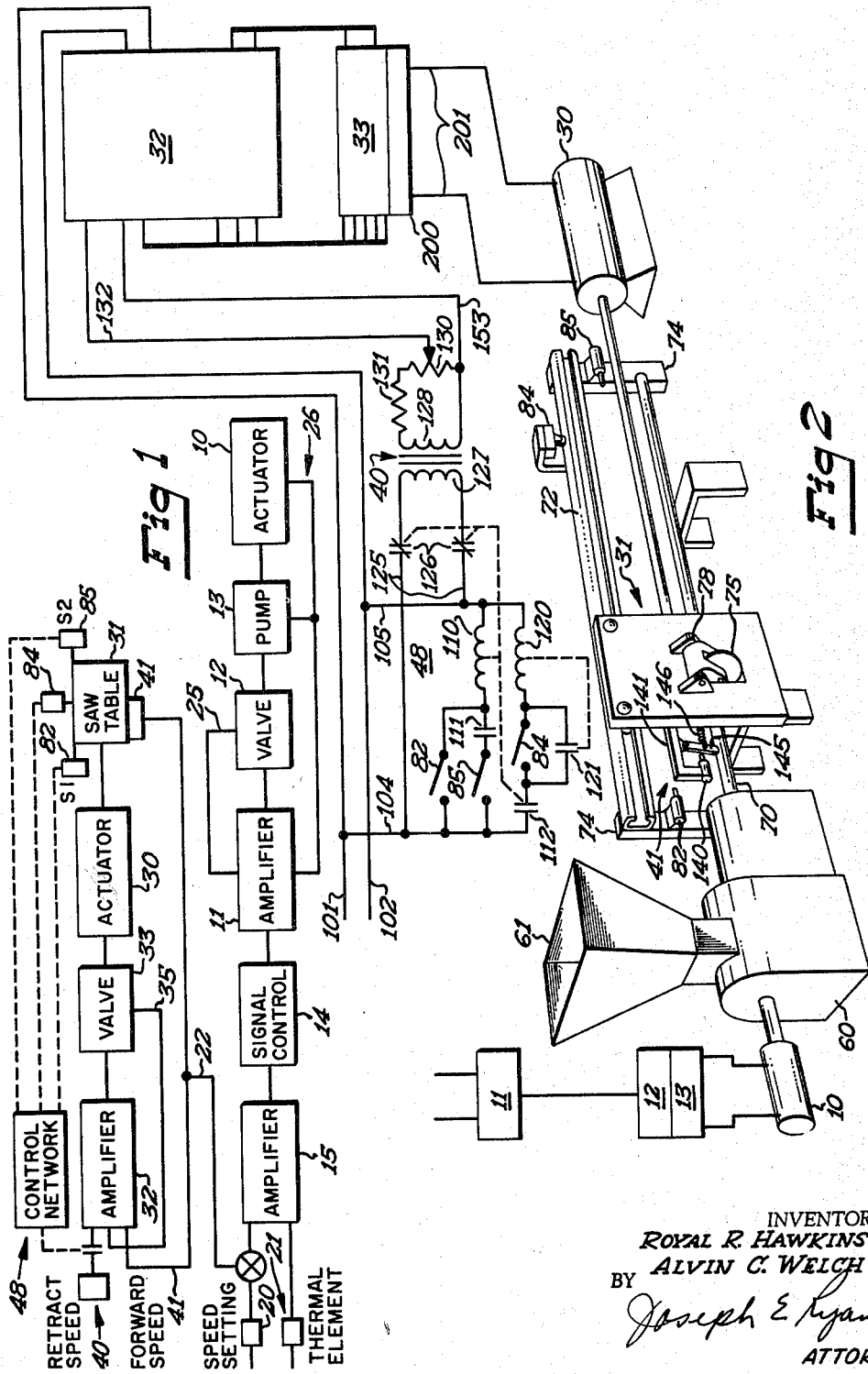

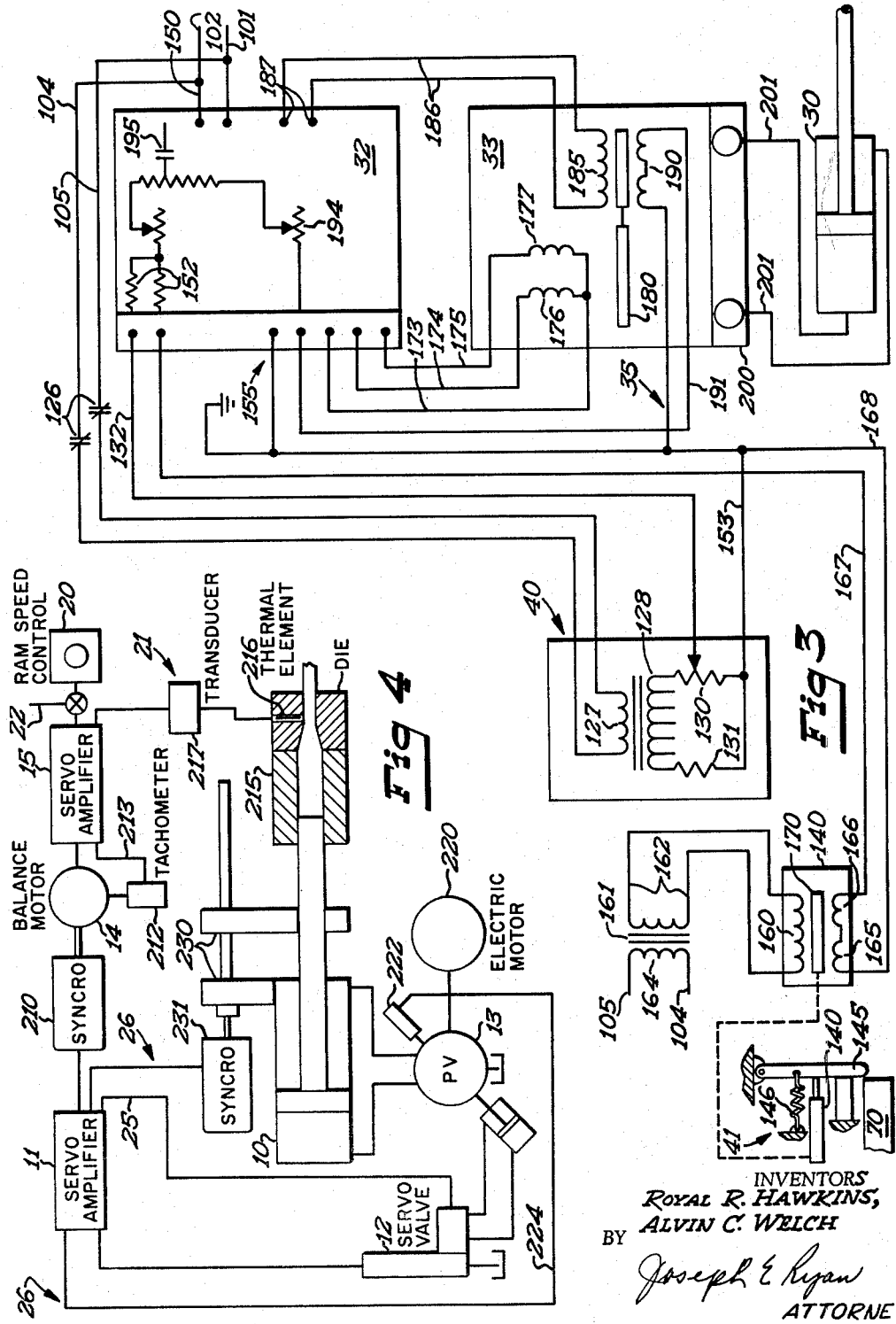

3,175,381
EXTRUSION PRESS CONTROL APPARATUS
Royal R. Hawkins, Bloomington, and Alvin C. Welch, Edina, Minn., assignors to Honeywell Inc., a corporation of Delaware
Filed May 31, 1962, Ser. No. 199,105
12 Claims. (Cl. 72—8)

Our invention relates to control apparatus for extrusion presses and more particularly to apparatus controlling speed of operation of the extrusion press and associated apparatus for machine cutting of material extruded from the press. While extrusion presses and processes are generally well known, the present invention is directed to improved apparatus which will control the speed of the extrusion process to safeguard the associated die equipment and provide for uniformity of extrusion material and at the same time control the speed of extrusion with associated cutting or sawing apparatus such that the extrusion and sawing operation may become continuous. The improved sawing apparatus permits sawing or cutting of the extruded material in a continuous flow pattern without disrupting the operation of the press or any associated controls, while at the same time preventing damage to the cutting or sawing apparatus. This improved apparatus will be seen in the attached drawings, in which:

FIGURE 1 is a schematic block diagram of the improved control apparatus for press speed control and control of associated cutting or sawing apparatus, FIGURE 2 is a diagrammatic disclosure of the press with the associated apparatus, FIGURE 3 is a schematic wiring diagram for the saw control, and FIGURE 4 is a schematic circuit diagram of the improved speed control for the extrusion press.

As will be seen in FIGURE 1, the improved apparatus is shown in block form as including speed control circuits for two actuators, the control circuits of which are interconnected. Thus, as seen in FIGURE 1, the main actuator for the extrusion press is shown in block at 10, this actuator being of the hydraulic type and having as a control therefor an amplifier 11, valve 12 and pump 13 configuration to control the flow of hydraulic fluid to the hydraulic actuator as established by an electrical signal to the amplifier, which signal controls the electrohydraulic valve 12. The amplifier 11 is supplied signals from a signal control 14 which in turn is controlled by an amplifier 15. The input circuit to amplifier 15 includes a speed setting device 20, a temperature control circuit 21 associated with the die of the extrusion press and a third input signal or conductor indicated at 22 which signal modifies or alters the speed setting signal in accordance with the speed of operation of associated sawing equipment. The press control circuit includes conventional feedback linkages between the electrohydraulic valve and the amplifier 11 such as is indicated by the loop 25 and a second feedback loop, indicated generally at 26, is connected between the amplifier 11 and pump 13 and actuator 10, this being a speed responsive loop between the motor being positioned and the amplifying or controlling device 11.

The control apparatus includes also an actuator 30 connected to or associated with a saw mounting table indicated generally at 31, the actuator 30 being controlled by an electrohydraulic valve 33 and amplifier 32 arrangement with a feedback loop, indicated generally at 35, being connected between the amplifier and valve. The input circuit to the amplifier includes a retract speed setting device 40 and a forward speed setting device, indicated generally at 41, as associated with the saw table or mounting assembly 31 in a manner latter to be described. The retract speed setting device is connected to or controlled by a switching mechanism 126 (see FIGURE 2), to be later defined, associated with a control network indicated in block at 48 which control network has associated therewith switches indicated generally at 82, 84 and 85 to be later described. These switches are shown and associated with the saw table and, as will be later noted, will be operated thereby. Thus, the saw actuator 30 is controlled in a forward direction by means of a signal from a signal producer 41 associated with the saw table which controls the amplifier and the valve to control the actuator in a conventional manner with a feedback loop between the valve and amplifier for stabilization purposes. Retract speed is controlled by a separate setting device which is selectively connected to the amplifier 32 by means of a switching mechanism 126 controlled by a network 48 which includes a plurality of switches associated mechanically with the saw table or mounting assembly 31. The output of the transducer 41 indicating the speed of operation of the actuator associated with the saw table is connected by means of the conductor 22 into the amplifier 15 with the speed setting signal 20 for the press actuator to modify the speed setting signal in accordance with the velocity of the associated cutting equipment.

In FIGURE 2 a diagrammatic disclosure of the extrusion press together with associated apparatus is shown. The extrusion press is indicated generally at 60 and includes a hopper 61 through which the material to be extruded is admitted. The press includes an actuator 10. The extrusion press discharges an ingot of extruded material such as indicated generally at 70, the operation of this apparatus being continuous. FIGURE 2 schematically shows the saw mounting assembly 31 as mounted or adapted to be positioned adjacent to and relatively parallel to the press runout or the path of the extruded material. The saw mounting assembly 31 actually rides on a guide means indicated generally at 72 which is secured or mounted through suitable means or bracket means 74 shown schematically for positioning the saw assembly as indicated above. The saw mounting assembly includes the saw 75 mounted on the assembly and adapted to be pivoted thereon through a mounting such as is generally indicated at 78. The saw mounting assembly is adapted to move back and forth within the guide means along or adjacent to the extruded material from the press 60. The assembly is positioned by means of an actuator 30 which drives the same in both the forward or advance and the reverse or retract directions. Thus, the assembly 31 will advance on the guide means parallel to and adjacent with the extruded material as it leaves the press and at or near the end of the guide means will reverse and retract back to the starting position at a particular speed. The saw 75 is pivoted on the assembly 78 and suitably positioned or moved through means not shown such that it can be deflected toward and away from the extruded material for cutting purposes. Mounted on the base and associated with the mounting assembly or guide means are a plurality of limit switches indicated generally at 82, 84 and 85, which limit switches are adapted to be engaged by or operated by the saw mounting assembly 31 as it moves between the limit positions on the guide means 72. The limit switches 82 and 85 define the limit positions for the saw mounting assembly on the guide means. Switch 84 is positioned intermediate the switches 82, 83 on the guide means and is adapted to be operated by the saw mounting assembly as it passes by. This switch controls or provides a limit for operation of the saw motor through an auxiliary control as will be later defined.

Control network 48 includes line conductors 104 and 105 which are connected respectively to the supply conductors 101 and 102 and have connected across the same switch 82 leading to a relay coil 110. The coil 110 or relay mechanism has a holding contact 111 associated therewith which is in series with the stop limit switch 85 to produce the operation to be later defined. Also connected across the conductors 104, 105 is the intermediate limit switch 84 which also has in series therewith a normally open contact 112 controlled by relay coil 110. The circuit through the switch 84 includes the coil 120 of a second relay mechanism designed to control the operation of the saw, that is the on-off operation of the saw and positioning of the same relative to the extruded material. This relay includes a contact 121 connected around the switch 84 such that the relay energization may be initiated by operation of the switch 84 but continues operation when once initiated until such a time as the contact 112 opens up. The conductors 104, 105 also have connected thereto supply conductors 125 leading through normally closed isolating contacts 126 to the primary winding 127 of a transformer whose secondary winding 128 energizes an adjustable signal potentiometer 130 through a current limiting resistor 131 forming generally the retract speed setting device. This apparatus provides a speed setting signal for the retract direction of the flying saw control assembly and the wiper of the adjustable potentiometer 130 is connected through an input conductor 132 to the control amplifier 32 for the actuator 30 of the saw assembly which is completed by conductor 153 to potentiometer 130. Also included on the saw table is the second control indicated generally at 41 for forward speed setting and having a transducer indicated at 140. This device adjusts the speed of operation in the forward direction of the saw's mounting assembly, that is along in the direction of movement of the extruded part. This speed setting or primary control includes generally a mounting assembly 141 for the signal transducer 140 which signal transducer is basically a movable core differential signal transformer as will be seen more clearly in FIGURE 3. The movable element of the differential transformer is carried by or connected to a pivoted lever 145 which has associated therewith a spring means 146 secured between the saw mounting assembly and the lever. This spring-biased movable lever 145 is adapted to be engaged by or otherwise influenced by movement of the extruded material from the press 60 such that it will adjust the signal transducer 140 against the spring 146 to indicate position and hence the relative position and hence the speed between the saw mounting assembly 31 and the extruded material 70 such that the motor or actuator 30 may have its speed adjusted to bring the relative speed between these parts to zero at which time the saw may be operated without damage thereto. The specific control circuitry for the amplifier 32 from the control 41 is shown more in detail in FIGURE 3. It will be recognized, however, that the control 41 as well as the control 40 will supply input signals to the amplifier 32 of which the signal from control 41 will be continuous while the signal from control 40 will be selectively connected into the amplifier 32 through the control network 48. The output of the amplifier 32 controls the electric portion of the electrohydraulic valve 33 which in turn hydraulically controls the operation of the hydraulic actuator 30. Similarly a press actuator 10 is controlled by means of the valve pump combination 12, 13 receiving signals from the amplifying means 11 which is controlled by feedback signals and the signal from the signal controller 20, 21, 22 as shown in FIGURE 1. This portion of the apparatus will be more fully disclosed in FIGURE 4.

In FIGURE 3 an electrical circuit diagram for the saw portion of the apparatus, together with a schematic disclosure of the valve and actuator, is shown. The amplifier 32 is a conventional amplifier capable of receiving a plurality of inputs connected through summing resistors to the input of the amplifier. The output of the amplifier is designed to power either balanced single loads such as a split field of a torque motor for the valve as shown in FIGURE 3 or separate direct current loads. The amplifier 32, as well as amplifiers 11 and 15, are shown in block form for simplicity since they are conventional. Thus, as shown in FIGURE 3, the retract speed control potentiometer 130 is energized from the transformer 127, 128 through the control of the normally closed switches 126 which are a part of the relay 110 of the network 48. The supply conductors 101, 102 supplying the network also supply an alternating source of power to the amplifier as indicated at 150. The potentiometer 130 is connected by means of the conductors 132, 153 to the input of the amplifier including a summing resistor network, such as is indicated at 152, within the amplifier. The conductor 153 leads to the grounded terminal 155 of the amplifier. The retract signal is controlled by means of the switches 126 from the control network 40 which switches are closed whenever the relay 110 is de-energized. This condition is brought about normally after a period of energization of the relay 110 with the holding contacts 111 established and the switch 85 is thereafter operated at the stop or far end of the guide means. This switch 85, being normally closed, would be momentarily opened to de-energize the relay 110, causing the normally close contacts 126 for the retract signal control to be allowed to return to their normal closed position. This will supply power to the retract speed control device and place an input signal across the conductors 132, 153 of the amplifier. The amplifier also receives continuous signals from the forward speed or advance speed controller which unit is indicated generally at 41. Its transducer 140, shown schematically in FIGURE 3, is a linear voltage differential transformer having a primary winding 160 which is connected to an insolating and energizing transformer 161 through conductors 162. The energizing transformer 161 or voltage reducing transformer is connected at its primary winding 164 to the alternating current source of power, such as indicated by conductors 104, 105. The secondary of the transducer includes a pair of secondary windings 165, 166 which are serially connected in opposition and provide an output signal through a pair of conductors 167, 168 leading to the amplifier. The conductor 167 is connected to the input of the amplifier or the summing network generally disclosed at 152, while the conductor 168 leads to the ground connection 155 of the amplifier. The differential transformer includes a movable core 170 which is engaged by the pivoted lever 145 of the advance speed control 41. The lever 145, as previously indicated, is urged or influenced by the extruded material and movement of the same relative to the saw mounting structure upon which this apparatus is mounted moves the moving part of the signal transducer, that is the core 170, to move against internal centering springs (not shown) and provide a varied signal output from the transducer. The output of the amplifier 32 is impressed across the conductors 173, 174, 175 which lead to a pair of windings 176, 177 of the valve means 33. The valve is shown schematically as a spool assembly 180 having attached thereto a feedback transducer of the linear voltage differential type. This feedback transducer includes an energizing winding 185 connected through conductors 186 to the power supply portion of the amplifier such as is indicated at terminals 187 thereof. Secondary windings 190 of the feedback transducer are connected respectively between conductors 191 and the ground conductor 155 of the amplifier and provide an input signal of the feedback type through the additional ratio potentiometer 194 of the amplifier. Although the amplifier details are not shown, it will be recognized that these input signals across the summing resistors 152 and ratio potentiometer 194 will be adjusted or connected at a common point and coupled through a condenser such as indicated at 195 to the various amplifying stages of the apparatus. The output signal therefrom is a varying magnitude direct current between a common output conductor such as indicated at 173 and output conductors 174, 175. Thus, the differential windings 176, 177 are differentially energized to position the valve and provide a varying outflow from the manifold of the valve indicated at 200 through hydraulic lines 201 to the actuator shown schematically at 30. It will be understood that the hydraulic source is omitted herein for purposes of simplicity.

The circuit disclosure of FIGURE 4 relates to the speed control through the extrusion press. This circuit is schematically shown with additional detail to that of FIGURE 1. It includes a speed setting device 20 which is connected to amplifier 15 which is conventional and is shown again in block for simplicity. The amplifier is designed to control the energization of signal control motor 14 which motor drives a rotary signaling device 210, such as a synchro, to produce an output signal in accordance with the setting of the unit 20. Control motor 14 includes a feedback tachometer indicated in block at 212 which is connected in a feedback loop 213 to the amplifier 15. The amplifier 15 also receives an input signal from the temperature responsive means associated with the die of the press through the circuit indicated generally at 21 in FIGURE 1. In FIGURE 4 it will be seen that the die which is indicated generally at 215 includes a thermal element 216 inserted into the surface thereof, which thermal element controls a signal transducer 217 to provide an output signal or a temperature modifying signal through the input circuit 21 to the amplifier 15. Element 216 may take the form of a bulb or resistor or other form to provide with a suitable transducer or converting device, an electrical output signal having a magnitude proportional to the ambient temperature sensed at the element. Thus, the signals from the setting device and the thermal system control the energization of the amplifier 15 which drives the instrument motor 14 to produce a signal output from a synchro type signaling device 210 feeding the second amplifier 11, which amplifier controls the operation of the electrohydraulic type valve 12. The valve 12 controls the slide block or equivalent apparatus on the variable displacement pump 13 driven by an electric motor 220 to provide an output of the hydraulic type to the actuator 10. The variable displacement pump includes a feedback device such as is indicated in block at 222, connected in a circuit 224 with amplifier 11 corresponding to the feedback circuit shown generally at 26 in FIGURE 1. The pump feedback transducer 222 indicates displacement of the slide block or hence the output from the pump when driven by the constant speed motor 220 in a second feedback circuit. The output of the variable displacement pump 13 provides a variable hydraulic flow to the motor or actuator 10 controlling the output of the extrusion press. Movement of the ram shaft is converted to a velocity signal by means of a ball screw nut drive indicated at 230 driving a signaling device or synchro 231 to complete the other portion of the feedback circuit 26 to the amplifier 11 shown generally in FIGURE 1.

The operation of the improved extrusion press control apparatus and flying saw assembly is interrelated as previously indicated. The ram speed of the actuator 10 of the extrusion press, which is shown only schematically in FIGURES 2 and 4, controls the speed at which extruded material is discharged from the press as a continuous extrusion. The subject apparatus is designed to be associated with or control the operation of a continuous extrusion process and hence the position of the ram and speed of movement of the same will control the rate at which material is discharged from the press. Details of the press per se are not pertinent to the invention herein but the speed of the operation of the press is controlled by a setting device or ram speed control 20 which energizes an amplifier 11. The motor 14 and signal generators 210 and 230 provide a suitable means for combining the input signals to the speed control although other forms may be utilized. This input signal together with the feedback signals from the actuator 10, pump 13 and valve 12 controls an amplifier 11 which controls the valve 12 and hence the variable displacement pump 13 by positioning the slide block of the same such that with the constant speed of rotation of the pump from the electric motor 220, the variable volume output will be obtained to control the positioning or rate of positioning of the actuator 10 in one direction or the other. The temperature variation of the extrusion press die 215 as sensed by the thermal element 216 provides an electrical signal from the transducer 217 which modifies the signal to the amplifier 15 to vary the magnitude of its signal output. This input signal from the die operates to reset the speed signal and hence the pump controlling the press or the speed of operation of the same in accordance with the temperature of the die. Thus, whenever speed of press operation becomes too high or other factors affecting extrusion temperature vary, the temperature of the die increases and tends to cause size loss of extrusion. With the temperature control or monitor, the speed of operation of the press may be varied to bring it within a range which will provide for proper temperature operation of the press for maximum efficiency of the same and improved operation of the apparatus.

The flying saw portion of the apparatus is a hydraulic motor driven table upon which a cutting saw is arranged or positioned for the purpose of severing the extrusion or continuous ingot into predetermined lengths for handling purposes. Through the use of the flying saw, continuous operation of the press may be provided since there will be no need for shutting down the press during cutting operation. The hydraulic motor driven saw assembly is controlled through a network which includes limit switches at either extremity of the travel of the saw mounting assembly on a guide positioning the same. The control network 48 for the saw assembly permits the limit switch at the press end of the travel to operate a relay and isolate a retract speed signaling device from the network. When so isolated, only the signal produced by the forward speed controller 41 mounted on the saw assembly is present or connected to the amplifier 32 controlling the motive means 30 for the saw assembly. This speed control 41 is biased to provide an output signal in the advance direction of a predetermined magnitude. It is mounted on the saw assembly 31 and is positioned adjacent the extrusion such that it is influenced by the movement of the extrusion either by direct contact or indirect association so that it will indicate a relative difference in position and thus a relative difference in speed and position therebetween. The speed control 41 will be adjusted by a speed difference to provide a variable input signal to the amplifier 32 to adjust the speed of the motor or actuator 30 positioning the saw assembly 31 on the guide so that the saw may be operated with no relative movement between the table and the extrusion to complete the cutting operation without damage to the saw or the extrusion being cut. The secondary switch 84 of the network provides a means for initiating the operation of the saw through motive means (not shown) on the saw mounting assembly which will actually rotate the saw and displace it relative to the extrusion. This intermediate switch of the control network will be effective only when a circuit is set up in the control network indicating that the table is being operated in the forward direction. While the motive means are shown herein as electrohydraulic mechanisms, it will be recognized that electric motors may be utilized as the ultimate positioning motive means. Feedback is provided from the control valves for stabilization purposes in a conventional manner. The signal output from the control amplifier 32 controlling saw speed and direction is connected into the speed control circuit for the press and is of such polarity that it will modify the speed of the press primarily during reverse drive of the saw assembly.

In considering this invention, it should be remembered that the present disclosure is intended to be illustrative only and the scope of the invention should be determined only by the scope of the appended claims.

We claim as our invention:

1. A flying saw apparatus comprising, a base member, guide means mounted on said base member, a saw mounting assembly mounted on said guide means and being movable in a reciprocating movement back and forth on said guide means and adapted to be positioned adjacent to and movable parallel with a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control including a first and second limit switch means positioned at opposite extremities of said guide means and adapted to be operated by said saw mounting assembly, one of said limit switch means adapted to connect a retract speed signal to said control means and the other of said limit switch means being adapted to disconnect said retract speed signal means from said control means, a primary speed control means providing a variable speed signal in an advance direction for said saw mounting assembly mounted on said saw assembly and connected in controlling relation to said control means, means including a pivoted spring biased linkage connected to a movable part of said primary speed control means for varying the speed output signal therefrom, said linkage being adapted to be engaged by the extrusion from said press to adjust the speed of said saw assembly to the speed of said extrusion.

2. A flying saw apparatus comprising, a base member, guide means mounted on said base member, a saw mounting assembly mounted on said guide means and being movable in a reciprocating movement back and forth on said guide means and adapted to be positioned adjacent and parallel to a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, a first speed control means adapted to produce retract operation of said motive means, one of said limit switch means being adapted to connect said first speed signal to said control means and the other of said limit switch means being adapted to disconnect said first speed control means from said control means, a second speed control means providing a variable speed signal in an advance direction for said saw mounting assembly and mounted on said saw mounting assembly and connected in controlling relation to said control means, means including a pivoted spring biased linkage connected to a movable part of said second speed control means for varying the speed signal therefrom, said linkage being adapted to be moved by the extrusion from said press to adjust the speed of said saw mounting assembly to the speed of said extrusion.

3. A flying saw apparatus comprising, a base member, guide means mounted on said base member, a saw mounting assembly mounted on said guide means and adapted to move in a reciprocating movement back and forth on said guide means adjacent and parallel to a continuous extrusion being discharged from an extrusion press, hydraulic motor means mounted on said base member and connected to said saw mounting assembly for moving said assembly on said guide means in said reciprocating movement, valve means for controlling the energization of said motor means to provide said reciprocating movement, amplifier means connected to and controlling the operation of said valve means, a control network controlling the operation of said amplifier means including first and second limit switch means positioned at opposite extremities of said guide means and adapted to be operated by said saw mounting assembly, one of said limit switch means being adapted to connect a retract speed signal to said amplifier means and the other of said limit switch means being adapted to disconnect said retract speed signal from said amplifier means, a primary electric speed control means providing a variable speed signal in an advance direction for said saw mounting assembly mounted on said saw mounting assembly and connected in controlling relation to said amplifier means, means including a pivoted spring biased linkage connected to a movable part of said primary electric speed control means for varying the speed signal therefrom, said linkage being adapted to be moved by the extrusion from said press to adjust the speed of said saw mounting assembly to the speed of said extrusion.

4. A flying saw apparatus comprising, a base member, guide means mounted on said member, a saw mounting assembly mounted on said guide means and being movable in a reciprocating movement back and forth on said guide means and adapted to be positioned adjacent and movable parallel with a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means being adapted to connect a retract speed signal to said control means and the other of said limit switch means being adapted to disconnect said retract speed signal from said control means, a primary speed control means providing a variable speed signal in an advance direction for said saw mounting assembly mounted on said saw mounting assembly and connected in controlling relation to said control means, means including a pivoted spring biased linkage connected to a movable part of said primary speed control means for providing a variable speed output signal therefrom, said linkage being adapted to be moved by the extrusion from said press to adjust the speed of said saw mounting assembly to the speed of said extrusion, and additional switch means included in said network and mounted on said guide means to be engaged by said saw mounting assembly intermediate the limit switch positions, said additional switch means being operative and adapted to control the raising and lowering of a saw on said saw mounting assembly relative to the extrusion.

5. A flying saw apparatus comprising, a base member, guide means mounted on said member, a saw mounting assembly mounted on said guide means and adapted to move in a reciprocating movement back and forth on said guide means and adapted to be positioned adjacent and movable parallel with a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means being adapted to connect a retract speed signal to said control means and the other of said limit switch means being adapted to disconnect said retract speed signal from said control means, a primary speed control means providing a variable speed signal in an advance direction for said saw mounting assembly mounted on said saw mounting assembly and connected in controlling relation to said control means, means including a pivoted spring biased linkage connected to a movable part of said primary speed control means for varying the speed signal therefrom, said linkage being adapted to be moved by the extrusion from said press to adjust the speed of said saw mounting assembly to the speed of said extrusion, and additional switch means included in said network and mounted on said guide means to be engaged by said saw mounting assembly intermediate the limit switch positions, said additional switch means being operative and adapted to control the operation of a saw on said saw mounting assembly as it moves with the extrusion.

6. A flying saw apparatus comprising, a base member, guide means mounted on said member, a saw mounting assembly mounted on said guide means and being movable in a reciprocating movement back and forth on said guide means and adapted to be positioned adjacent and movable parallel to a continuous extrusion being discharged from an extrusion press, first motive means mounted on said base member and connected to said saw mounting assembly for moving said assembly on said guide means in said reciprocating movement, first control means for controlling the energization of said first motive means to provide said reciprocating movement, a control network controlling the operation of said first control means including first and second limit switch means positioned at opposite extremities of said guide means and adapted to be operated by said saw mounting assembly, one of said limit switch means being adapted to connect a retract speed signal to said first control means and the other of said limit switch means being adapted to disconnect said retract speed signal from said first control means, a primary speed control means providing a variable speed signal in an advance direction for said saw mounting assembly mounted on said saw mounting assembly and connected in controlling relation to said first control means, means including a pivoted spring biased linkage connected to a movable part of said primary speed control means for varying the speed signal therefrom, said linkage being adapted to be engaged by the extrusion from said press to adjust the speed of said saw mounting assembly to the speed of said extrusion, additional switch means included in said network and mounted on said guide means to be engaged by said saw mounting assembly intermediate the limit switch positions, said additional switch means being operative and adapted to control the operation of a saw on said saw mounting assembly relative to the extrusion, second motive means adapted to control the speed of operation of said press, speed setting means for said second motive means, second control means for controlling the operation of said second motive means connected to and controlled by said speed setting means, temperature responsive means adapted to be positioned in the die of said press connected to said second control means and operative to modify the effect of said speed setting means on said second control means, and means connecting said primary speed control means to said second control means to further modify the operation of said second motive means in accordance with the operation of said first motive means.

7. A flying saw apparatus comprising, a base member, guide means mounted on said member, a saw mounting assembly mounted on said guide means and being movable in a reciprocating movement back and forth on said guide means and adapted to be positioned adjacent and movable parallel to a continuous extrusion being discharged from an extrusion press, motor means mounted on said base member and connected to said saw mounting assembly for moving said assembly on said guide means in said reciprocating movement, amplifier means for controlling the energization of said motor means to provide said reciprocating movement, a control network controlling the operation of said amplifier means including first and second limit switch means positioned at opposite extremities of said guide means and adapted to be operated by said saw mounting assembly, one of said limit switch means being adapted to connect a retract speed signal to said amplifier means and the other of said limit switch means being adapted to disconnect said retract speed signal from said amplifier means, a primary speed control means providing a variable speed signal in an advance direction for said saw mounting assembly mounted on said saw mounting assembly and connected in controlling relation to said amplifier means, means including a pivoted spring biased linkage connected to a movable part of said primary speed control means for varying the speed signal therefrom, said linkage being adapted to be operated by movement of the extrusion material from said press to adjust the speed of said saw mounting assembly to the speed of said extrusion, additional switch means included in said network and mounted on said guide means to be engaged by said saw mounting assembly intermediate the limit switch positions, said additional switch means being operative and adapted to control the operation of a saw on said saw mounting assembly relative to the extrusion, and additional circuit means included in said network interconnecting the limit switch means controlling advance movement of said saw mounting assembly with said additional switch means to limit the operation of said additional switch means with forward movement of said saw mounting assembly.

8. A flying saw apparatus comprising, a base member, guide means mounted on said member, a saw mounting assembly mounted on said guide means and being movable in a reciprocating movement back and forth on said guide means and adapted to be positioned adjacent and movable parallel to a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means being adapted to connect a retract speed signal to said control means and the other of said limit switch means being adapted to disconnect said retract speed signal from said control means, a primary speed control means providing a variable speed signal in an advance direction for said saw mounting assembly mounted on said saw mounting assembly and connected in controlling relation to said control means, means including a pivoted spring biased linkage connected to a movable part of said primary speed control means for varying the speed signal therefrom, said linkage being adapted to be operated by movement of the extrusion from said press to adjust the speed of said saw mounting assembly to the speed of said extrusion, additional switch means included in said network and mounted on said guide means to be engaged by said saw mounting assembly intermediate the limit switch positions, said additional switch means being operative and adapted to control the operation of a saw on said saw mounting assembly relative to the extrusion, additional circuit means included in said network interconnecting the limit switch means controlling advance movement of said saw mounting assembly with said additional switch means to limit the operation of said last named switch means with forward movement of said saw mounting assembly, second motive means adapted to control speed of operation of said press, speed setting signal means for said second motive means, second control means for controlling the operation of said second motive means connected to and controlled by said speed setting means, temperature responsive means adapted to be poitioned in the die of said press connected to said second control means and operative to modify the effect of said speed setting means on said second control means, and means connecting said primary speed control means to said second control means to further modify the operation of said second motive means in accordance with the operation of said first named motive means.

9. A flying saw apparatus comprising, a base member, guide means mounted on said member, a saw mounting assembly mounted on said guide means and being movable in a reciprocating movement back and forth on said guide means and adapted to be positioned adjacent and movable parallel to a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means being adapted to connect a retract speed signal to said control means and the other of said limit switch means being adapted to disconnect said retract speed signal from said control means, a primary speed control means providing a variable speed signal in an advance direction for said saw mounting assembly mounted on said saw mounting assembly and connected in controlling relation to said control means, means including a pivoted spring biased linkage connected to a movable part of said primary speed control means for varying the speed signal therefrom, said linkage being adapted to be moved by the extrusion from said press to adjust the speed of said motive means for said saw mounting assembly to the speed of said extrusion, additional switch means included in said network and mounted on said guide means to be engaged by said saw mounting assembly intermediate the limit switch positions, said additional switch means being operative and adapted to control the operation of a saw on said saw mounting assembly relative to the extrusion, and additional circuit means included in said network interconnecting the limit switch means controlling advance movement of said saw mounting assembly with said additional switch means to limit the operation of said additional switch means with forward movement of said saw mounting assembly.

10. A flying saw apparatus comprising, a base member, guide means mounted on said base member, a saw mounting assembly mounted on said guide means and being movable in a reciprocating movement back and forth on said guide means and adapted to be positioned adjacent and movable parallel to a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means being adapted to connect a retract speed signal to said control means and the other of said limit switch means being adapted to disconnect said retract speed signal from said control means, a primary speed control means providing a variable speed signal in an advance direction for said saw mounting assembly mounted on said saw mounting assembly and connected in controlling relation to said control means, means including a pivoted spring biased linkage connected to a movable part of said primary speed control means for varying the speed signal therefrom, said linkage being associated with the extrusion from said extrusion press and adapted to be moved by relative movement between said saw mounting assembly and said extrusion to adjust the speed signal of said primary speed control means such that the speed of said saw mounting assembly approximates the speed of said extrusion.

11. A flying saw apparatus comprising, a base member, guide means mounted on said base member, a saw mounting assembly mounted on said guide means and being movable in a reciprocating movement back and forth on said guide means and adapted to be positioned adjacent and movable parallel to a continuous extrusion being discharged from an extrusion press, motive means mounted on said base member and connected to said saw mounting assembly for moving said assembly on said guide means in said reciprocating movement, control means for controlling the energization of said motive means to provide said reciprocating movement, a control network controlling the operation of said control means including first and second limit switch means positioned at opposite extremities of said guide means and adapted to be operated by said saw mounting assembly, one of said limit switch means adapted to connect a retract speed signal to said control means and the other of said limit switch means being adapted to disconnect said retract speed signal means from said control means, a primary speed control means providing a variable speed signal in an advance direction for said saw assembly mounted on said saw assembly and connected in controlling relation to said control means, means including a pivoted spring biased linkage connected to a movable part of said primary speed control means for varying the speed signal therefrom, said linkage being associated with the extrusion from said extrusion press and adapted to be moved by relative movement between said saw mounting assembly and said extrusion to adjust the speed signal of said primary speed control means such that the speed of said saw mounting assembly approximates the speed of said extrusion, second motive means adapted to control the speed of operation of said press, speed setting means for said second motive means, second control means for controlling the operation of said second motive means connected to and controlled by said speed setting means, temperature responsive means adapted to be positioned in the die of said press connected to said second control means and operative to modify the effect of said speed setting means on said second control means, and means connecting said primary speed control means to said second control means to further modify the operation of said second motive means in accordance with the operation of said first named motive means.

12. A flying saw apparatus comprising, a base member, guide means mounted on said base member, a saw mounting assembly mounted on said guide means and being movable in a reciprocating movement back and forth on said guide means and adapted to be positioned adjacent to and parallel to a continuous extrusion being discharged from an extrusion press, motor means mounted on said base member and connected to said saw mounting assembly for moving said assembly on said guide means in said reciprocating movement, amplifying control means for controlling the energization of said motor means to provide said reciprocating movement, a control network controlling the operation of said amplifying control means including a first and a second limit control means positioned at opposite extremities of said guide means and adapted to be operated by said saw mounting assembly, a first speed control means adapted to produce retract operation of said motor means, one of said limit control means being adapted to connect said first speed control means to said amplifying control means and the other of said limit control means being adapted to disconnect said first speed control means from said amplifying control means, a second speed control means mounted on said saw mounting assembly and connected in controlling relation to said amplifying control means and providing a variable speed signal adapted to produce advance operation of said motor means, means including a pivoted spring biased linkage connected to a movable part of said second speed control means for varying the speed signal therefrom, said linkage being adapted to be moved by virtue of a difference in the speed of the extrusion from said press relative to the speed of said saw mounting assembly on said guide means to adjust the speed of said saw mounting assembly to the speed of said extrusion.

References Cited by the Examiner
UNITED STATES PATENTS

| | | | |
|---|---|---|---|
| 2,262,619 | 11/41 | Morris | 83—319 |
| 2,596,988 | 5/52 | Kent | 207—1.3 |
| 2,863,557 | 12/58 | Munker | 207—1.3 |

CHARLES W. LANHAM, *Primary Examiner*.